US007796291B2

(12) United States Patent
Hosaka et al.

(10) Patent No.: US 7,796,291 B2
(45) Date of Patent: Sep. 14, 2010

(54) ELECTRO-OPTICAL DEVICE, ELECTRO-OPTICAL DEVICE DRIVING METHOD, IMAGE PROCESSING CIRCUIT, IMAGE PROCESSING METHOD, AND ELECTRONIC APPARATUS

(75) Inventors: Hiroyuki Hosaka, Hatsumoto (JP); Hidehito Iisaka, Shiojiri (JP); Takashi Nishimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 832 days.

(21) Appl. No.: 11/534,144

(22) Filed: Sep. 21, 2006

(65) Prior Publication Data

US 2007/0080920 A1 Apr. 12, 2007

(30) Foreign Application Priority Data

Oct. 11, 2005 (JP) ............................ 2005-296832

(51) Int. Cl.
*G06K 15/00* (2006.01)
*H04N 9/64* (2006.01)
*H04N 1/00* (2006.01)

(52) U.S. Cl. ....................... 358/1.16; 358/404; 348/716

(58) Field of Classification Search ................. 358/400, 358/404, 444, 1.16, 1.17; 348/247, 716; 345/686, 530, 534, 535, 536, 537, 538, 539, 345/540, 541, 542, 543, 544, 554, 555, 564
See application file for complete search history.

(56) References Cited

U.S. PATENT DOCUMENTS 6,396,501 B1 * 5/2002 Wu ............................ 345/530
7,483,574 B2 1/2009 Sasaki
7,609,558 B2 * 10/2009 Hosono ................. 365/185.23

FOREIGN PATENT DOCUMENTS

| | | | |
|---|---|---|---|
| JP | B2 2605261 | | 2/1997 |
| JP | 2000112457 | * | 4/2000 |
| JP | A-2000-293149 | | 10/2000 |
| JP | A-2002-169523 | | 6/2002 |
| JP | A-2003-162272 | | 6/2003 |
| JP | A 2005-92181 | | 4/2005 |
| JP | 2007041024 | * | 2/2007 |

* cited by examiner

*Primary Examiner*—Jerome Grant, II
(74) *Attorney, Agent, or Firm*—Oliff & Berridge, PLC

(57) ABSTRACT

An electro-optical device includes a plurality of pixels arranged in association with intersections of a plurality of scanning lines and a plurality of data lines, each of the plurality of pixels displaying a grayscale level corresponding to a data signal supplied to a corresponding data line when a scanning line is selected; a memory that stores upper n bits of input image data in which the grayscale level of each of the plurality of pixels is designated by m bits and that reads the stored n bits of image data, where "m" and "n " represent positive integers satisfying a condition m>n; an adding circuit that adds lower (m−n) bits to the n bits of image data read from the memory; a selector that selects the input image data when the m bits of image data are input and that selects image data including the (m−n) bits added thereto by the adding circuit when the n bits of image data are read from the memory; a scanning line driving circuit that selects, from among the plurality of scanning lines, the scanning line corresponding to the image data selected by the selector; and a data line driving circuit that supplies the data signal based on the image data selected by the selector to the data line corresponding to the selected image data.

17 Claims, 12 Drawing Sheets

ELECTRO-OPTICAL DEVICE, ELECTRO-OPTICAL DEVICE DRIVING METHOD, IMAGE PROCESSING CIRCUIT, IMAGE PROCESSING METHOD, AND ELECTRONIC APPARATUS

BACKGROUND

1. Technical Field

The present invention relates to electro-optical devices that perform display in accordance with supplied image data, electro-optical device driving methods, image processing circuits, image processing methods, and electronic apparatuses.

2. Related Art

For display devices, it is important to make flickering less noticeable. In order to reduce flickering, for example, a technology described in Japanese Patent No. 2605261 (see FIG. 2) is suggested. In this technology, after image data for one frame is stored in first and second memories, the image data is read with a half-reduced horizontal scanning period. Thus, images for a period of two fields for interlaced scanning are converted into images for line sequential scanning by being compressed into images for a period of one frame (about 17 milliseconds).

In this technology, a memory with a sufficient capacity for storing two pieces of image data for one field, that is, image data for one frame, is necessary. Thus, a technology for reducing the memory capacity used by causing half of the image data for one frame to be output without using the memory is suggested (see, for example, JP-A-2005-92181).

However, only reducing the memory capacity used by half does not satisfy recent demands for cost reduction. Thus, a much simpler configuration is desired.

SUMMARY

An advantage of the invention is that it provides an electro-optical device having a much simpler configuration to store supplied image data in a memory and to read and display the image data, an electro-optical device driving method, an image processing circuit, an image processing method, and an electronic apparatus.

An electro-optical device according to an aspect of the invention includes a plurality of pixels arranged in association with intersections of a plurality of scanning lines and a plurality of data lines, each of the plurality of pixels displaying a grayscale level corresponding to a data signal supplied to a corresponding data line when a scanning line is selected; a memory that stores upper n bits of input image data in which the grayscale level of each of the plurality of pixels is designated by m bits and that reads the stored n bits of image data, where "m" and "n" represent positive integers satisfying a condition $m>n$; an adding circuit that adds lower $(m-n)$ bits to the n bits of image data read from the memory; a selector that selects the input image data when the m bits of image data are input and that selects image data including the $(m-n)$ bits added thereto by the adding circuit when the n bits of image data are read from the memory; a scanning line driving circuit that selects, from among the plurality of scanning lines, the scanning line corresponding to the image data selected by the selector; and a data line driving circuit that supplies the data signal based on the image data selected by the selector to the data line corresponding to the selected image data. Thus, a memory with a memory capacity only for image data for one frame, that is, about $n/(2m)$, is required. Thus, a further simpler configuration can be achieved.

In this case, the adding circuit may set, as 0 or 1, all the bits to be added to the n bits of image data read from the memory. In this configuration, the adding circuit may alternately switch, at a predetermined cycle, the bits to be added. In this case, the adding circuit may alternately switch, every time image data for one row is read from the memory, the bits to be added. Alternatively, the adding circuit may alternately switch, frame by frame, the bits to be added, in the case of image data of identical pixels. Alternatively, the adding circuit may alternately switch, every time image data for one row is read from the memory, the bits to be added, and alternately switches, frame by frame, the bits to be added, in the case of image data of identical pixels.

An electro-optical device according to another aspect of the invention including a plurality of pixels arranged in association with intersections of a plurality of scanning lines and a plurality of data lines, each of the plurality of pixels displaying a grayscale level corresponding to a voltage of a data signal supplied to a corresponding data line when a scanning line is selected, wherein a frame is divided into a first field and a second field, includes a memory that stores upper n bits of image data in which the grayscale level of each of the plurality of pixels is designated by m bits, the image data being input during a period of the frame, and that reads the stored n bits of image data after a period of one field passes and during a period in which the m bits of image data are not input, where "m" and "n" represent positive integers satisfying a condition $m>n$; an adding circuit that adds lower $(m-n)$ bits to the n bits of image data read from the memory; a selector that selects the input image data when the m bits of image data are input and that selects image data including the $(m-n)$ bits added thereto by the adding circuit when the n bits of image data are read from the memory; a scanning line driving circuit that selects, from among the plurality of scanning lines, the scanning line corresponding to the image data selected by the selector; a converter that converts the selected image data into a voltage having one of a positive polarity and a negative polarity on the basis of a predetermined potential and outputs the voltage as the data signal when the input m bits of image data are selected and that converts the selected image data into a voltage having the other one of the positive polarity and the negative polarity on the basis of the predetermined potential and outputs the voltage as the data signal when the image data including the $(m-n)$ bits added thereto is selected; and a data line driving circuit that supplies the data signal converted by the converter to the data line corresponding to the selected image data.

In this case, the adding circuit may alternately set, every time image data for one row is read from the memory, as 0 and 1, all the $(m-n)$ bits to be added, and may alternately set, frame by frame, as 0 and 1, all the $(m-n)$ bits to be added, in the case of image data of identical pixels.

An aspect of the invention not only includes an electro-optical device, but also includes an electro-optical device driving method, an image processing circuit, an image processing method, and an electronic apparatus including the electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
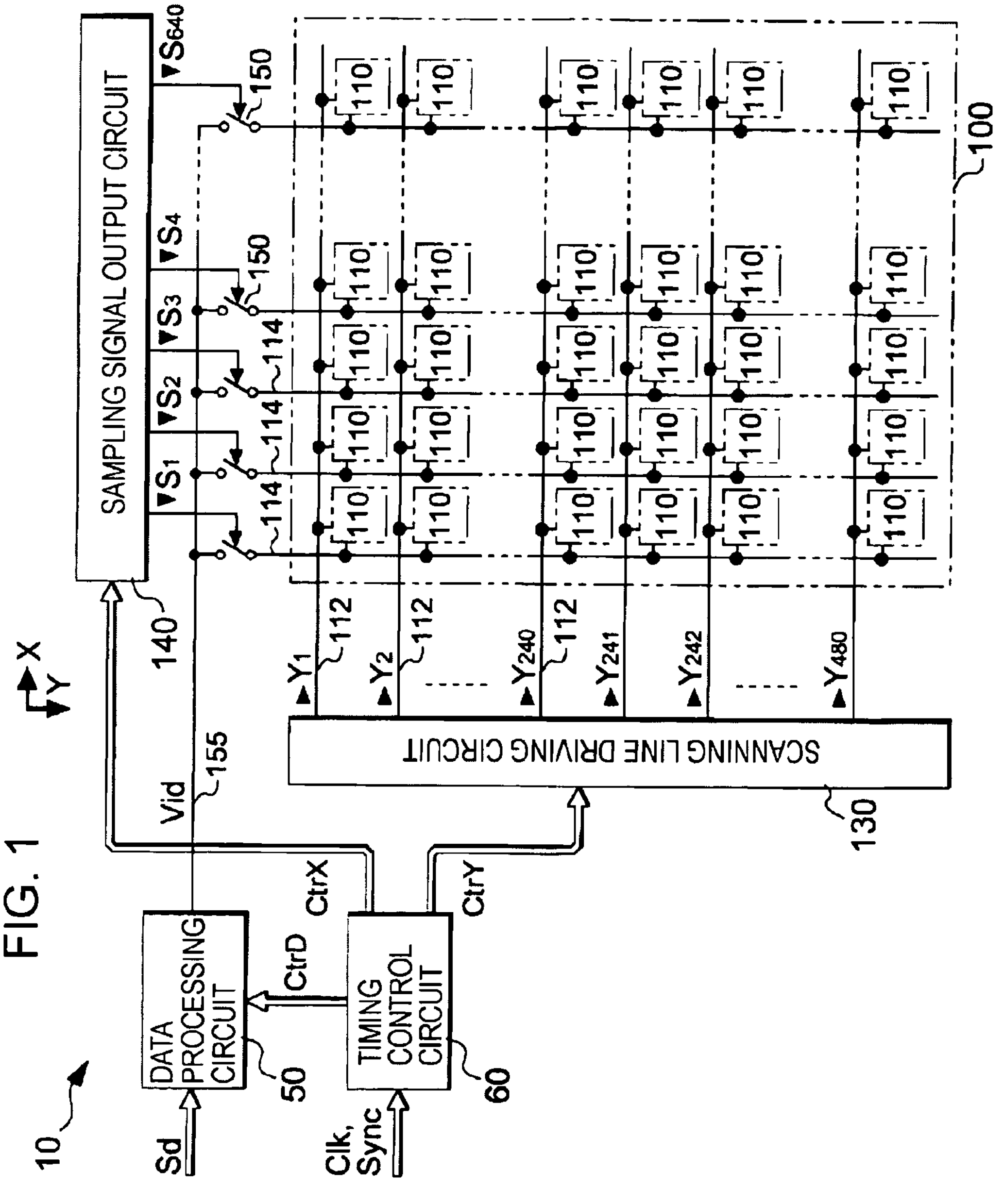
FIG. 1 is a block diagram showing an example of the configuration of an electro-optical device according to an embodiment of the invention.

Embodiments of the invention will now be described with reference to the drawings. FIG. 1 is a block diagram showing an example of the configuration of an electro-optical device 10 according to an embodiment of the invention.

Referring to FIG. 1, the electro-optical device 10 includes a data processing circuit 50, a timing control circuit 60, a display area 100, a scanning line driving circuit 130, a sampling signal output circuit 140, sampling switches 150, and the like.

In the display area 100, 480 scanning lines 112 are arranged along an X direction, and 640 data lines 114 are arranged along a Y direction. Pixels 110 are arranged in association with intersections of the scanning lines 112 and the data lines 114. Thus, in this embodiment, the pixels 110 are arranged in matrix of 480 rows and 640 columns. However, the pixels 110 are not necessarily disposed in this arrangement.

Figure 2:
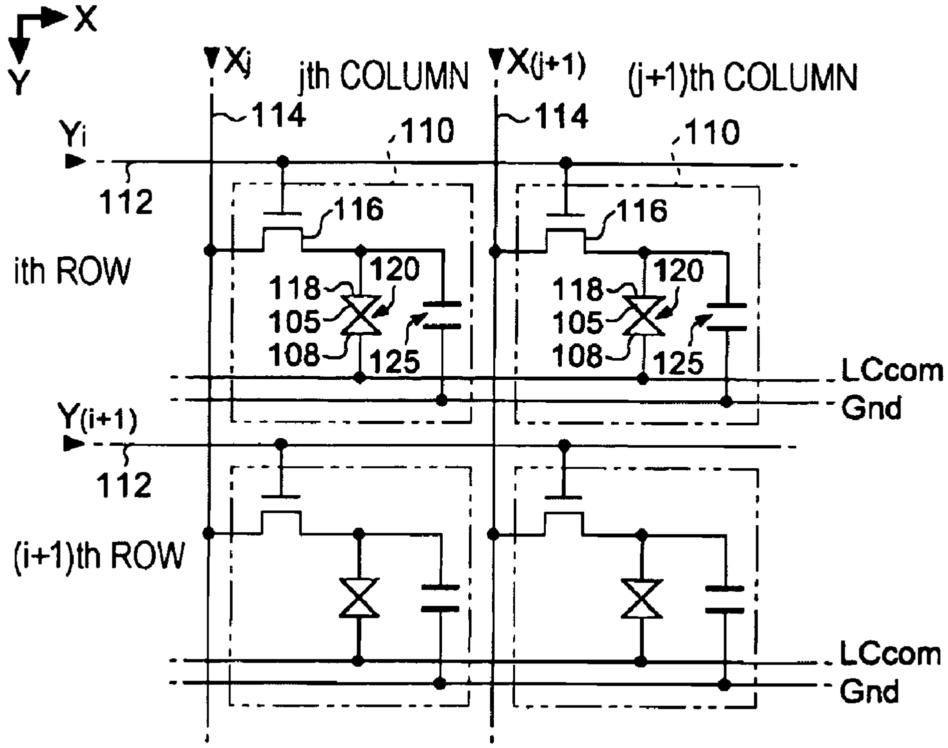
FIG. 2 shows an example of the configuration of pixels in the electro-optical device.

The configuration of the pixels 110 will now be described. FIG. 2 shows an example of the electrical configuration of the pixels 110. In FIG. 2, four pixels arranged in association with intersections of ith row and (i+1)th row, which is immediately below the ith row, and jth column and (j+1)th column, which is immediately right of the jth column, are shown.

Here, “i” and “(i+1)” are used for generally representing rows in which the pixels 110 are arranged and each represent an integer from 1 to 480. In addition, “j” and “(j+1)” are used for generally representing columns in which the pixels 110 are arranged and each represent an integer from 1 to 640.

Referring to FIG. 2, each of the pixels 110 functions as a switching element and includes an N-channel thin-film transistor (hereinafter, simply referred to as a “TFT”) 116 and a liquid crystal capacitor 120.

Since all the pixels 110 have the same configuration, the configuration of a pixel disposed in the ith row and the jth column will be explained as an example. The gate of the TFT 116 of the pixel 110 in the ith row and jth column is connected to the scanning line 112 of the ith row, the source of the TFT 116 of the pixel 110 is connected to the data line 114 in the jth column, and the drain of the TFT 116 of the pixel 110 is connected to a pixel electrode 118, which is one end of the liquid crystal capacitor 120. The other end of the liquid crystal capacitor 120 is a common electrode 108. The common electrode 108 is common for all the pixels 110. A temporally constant voltage LCcom is applied to the common electrode 108.

Although not particularly illustrated, the display area 100 is formed by joining a pair of an element substrate and a counter substrate together with a predetermined space therebetween. In addition, liquid crystal is held in the space. The scanning lines 112, the data line 114, the TFTs 116, and the pixel electrodes 118 are formed on the element substrate, and the common electrode 108 is formed on the counter substrate. The element substrate and the counter substrate are joined together such that surfaces on which the electrodes are formed face each other. Thus, in this embodiment, each of the liquid crystal capacitors 120 includes the pixel electrode 118 and the common electrode 108 that hold the liquid crystal 105.

On the opposing surfaces of the element substrate and the counter substrate, orientation films subjected to rubbing such that liquid crystal molecules are continuously twisted at, for example, about 90 degrees in the longitudinal direction between the element substrate and the counter substrate are formed. On the rear surfaces of the element substrate and the counter substrate, polarizers corresponding to an orientation direction are provided.

If the voltage effective value held in the liquid crystal capacitor 120 is zero, light transmitting between the pixel electrode 118 and the common electrode 108 rotates about 90 degrees in accordance with twisting of liquid crystal molecules. However, if the voltage effective value increases, liquid crystal molecules incline in the electric field direction. Thus, the optical activity is lost. Consequently, for example, for a transmission type, when polarizers are disposed on an incident side and a rear side such that the polarizing axis corresponds to the orientation direction, if the voltage effective value is close to zero, the transmission factor of light reaches the maximum value and white display is achieved. In contrast, if the voltage effective value increases, the amount of transmitted light decreases. When the transmission factor reaches the minimum value, black display is achieved. This is called a normally white mode.

With this configuration, when a selection voltage is applied to the scanning line 112 to turn on (electrically connect) the TFT 16 and a voltage higher (positive polarity) or lower (negative polarity) than the voltage LCcom of the common electrode 108 by a voltage corresponding to a desired grayscale level (brightness) is applied to the pixel electrode 118 via the data line 114 and the on-state TFT 116, a voltage effective value corresponding to the grayscale level can be held in the liquid crystal capacitor 120.

When a selection voltage is not applied to the scanning line 112, the TFT 116 is tuned off (not electrically connected). However, since the off resistance at this time does not reach the ideal infinite, not a few electric charges leak from the liquid crystal capacitor 120. In order to reduce the influence of leakage during the off-period, a storage capacitor 125 is provided for each pixel. One end of the storage capacitor 125 is connected to the pixel electrode 118 (the drain of the TFT 116), and the other end of the storage capacitor 125 is common for all the pixels. The storage capacitor 125 is maintained at a temporally constant potential, such as a ground potential Gnd.

Referring back to FIG. 1, the data processing circuit 50 processes image data Sd supplied from an external higher-level apparatus, converts the processed image data Sd into an analog voltage signal, and outputs the analog voltage signal as a data signal Vid to a video signal line 155.

The image data Sd is digital data for defining grayscale levels of pixels arranged in 480 rows and 640 columns. During the duration of one frame, image data Sd is supplied, in synchronization with synchronization signals Sync and clock signals Clk, in the order of pixels arranged in an area from the 1st row and the 1st column to the 1st row and the 640th column, pixels arranged in an area from the 2nd row and the 1st column to the 2nd row and the 640th column, pixels arranged in an area from the 3rd row and the 1st column to the 3rd row and the 640th column, . . . , and pixels arranged in an area from the 480th row and the 1st column to the 480th row and the 640th column.

Figure 3A:
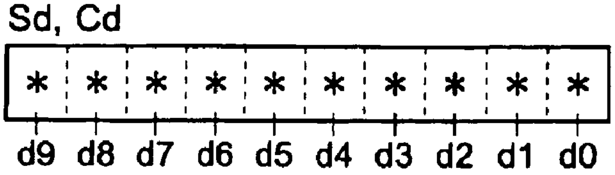
FIGS. 3A to 3C are explanatory diagrams showing image data used in the electro-optical device.

In this embodiment, the image data Sd has 10 bits from the most significant bit d9 to the least significant bit d0, as shown in FIG. 3A. Image data represented by "0000000000" (that is, "0" when represented as a decimal value) indicates the darkest grayscale level, and image data represented by "1111111111" (that is, "1023" when represented as a decimal value) indicates the brightest grayscale level.

The timing control circuit 60 generates, from a synchronization signal Sync and a clock signal Clk supplied from an external higher-level apparatus, a control signal CtrX for causing the sampling signal output circuit 140 to perform horizontal scanning on the display area 100, a control signal CtrY for causing the scanning line driving circuit 130 to perform vertical scanning on the display area 100, and a control signal CtrD for controlling processing performed by the data processing circuit 50.

In this embodiment, one frame is equally divided into two fields, and the pixels 110 in the display area 100 are driven. One frame is a period during which image data Sd for one frame is supplied. Generally, one frame is about 16.7 milliseconds long, which is the reciprocal of a frequency of 60 Hz. In addition, in order to distinguish between two fields within one frame, the temporally preceding field is called a "first field" and the temporally succeeding field is called a "second field".

In such driving, in one frame, the scanning line driving circuit 130 performs scanning along 480 scanning lines in the order described below. That is, for the sake of convenience, for example, the display area 100 is divided into an upper region including the 1st to 240th rows and a lower region including the 241st to 480th rows. In this case, in the first field, the scanning line driving circuit 130 exclusively selects rows from the top to the bottom, one by one, from the upper region and from the lower region in an alternate manner in that order. In contrast, in the second field, the scanning line driving circuit 130 exclusively selects rows from the top to the bottom, one by one, from the lower region and from the upper region in an alternate manner in that order.

Thus, in this embodiment, each of the scanning lines 112 is selected for the first field and for the second field, that is, each of the scanning lines 112 is selected twice during one frame.

Figure 5:
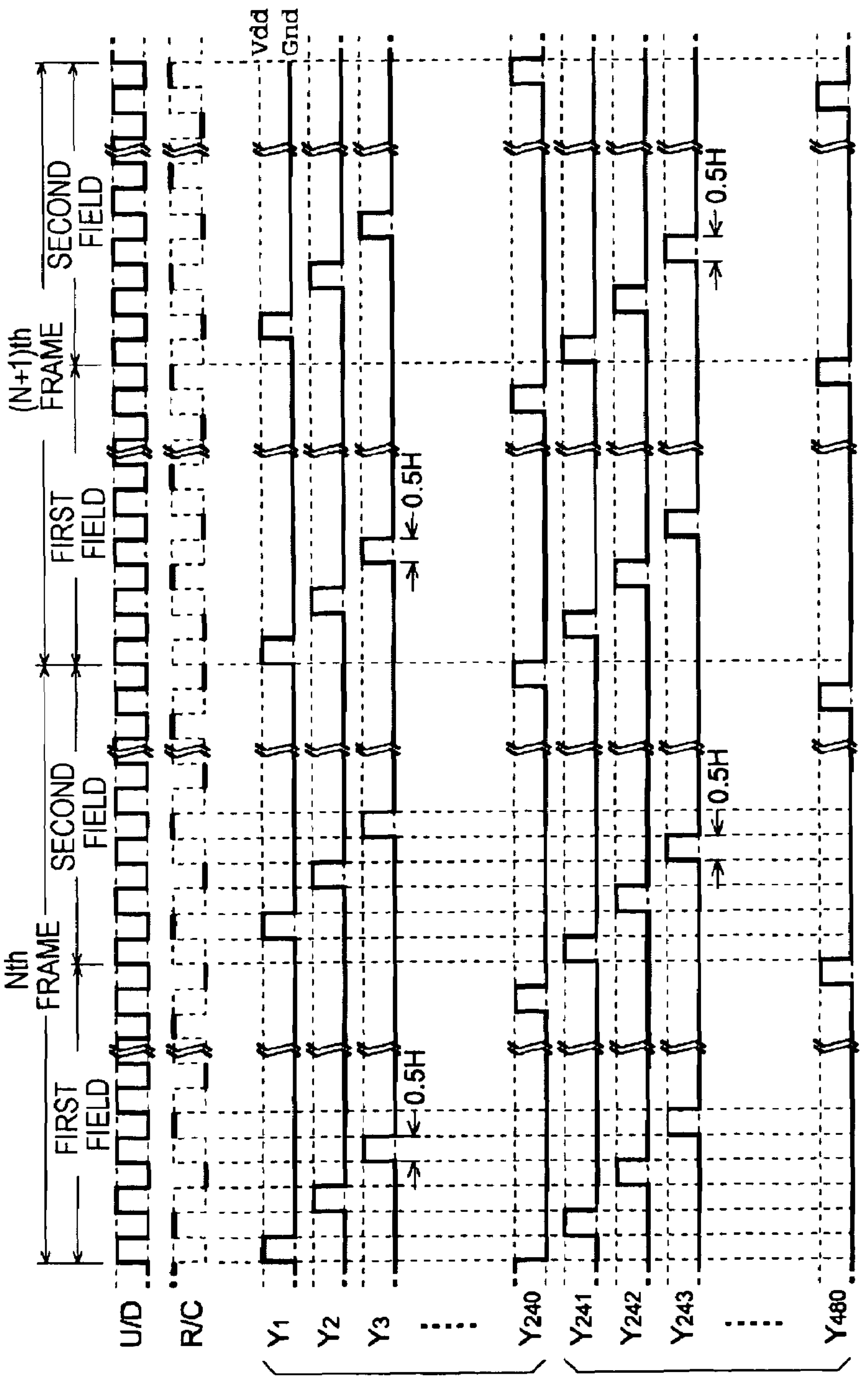
FIG. 5 shows scanning signals and the like used in the electro-optical device.

FIG. 5 shows waveforms of scanning signals Y1, Y2, Y3, . . . , and Y480 supplied from the scanning line driving circuit 130 to the scanning lines in the 1st to 480th rows when the scanning lines are selected in the order described above. In FIG. 5, a state in which a scanning signal corresponding to a selected scanning line is at an H level, which corresponds to a selection voltage Vdd, and a scanning signal corresponding to an unselected scanning line is at an L level, which corresponds to an unselection voltage, is shown.

In this embodiment, a voltage corresponding to the L level is equal to a ground potential Gnd with a voltage of zero and serves as a voltage reference. However, the reference of a write polarity for the liquid crystal capacitors 120 is an amplitude center potential Vc of a data signal Vid. In this embodiment, the reference of the write polarity corresponds to a voltage LCcom applied to the common electrode 108.

Figure 7:
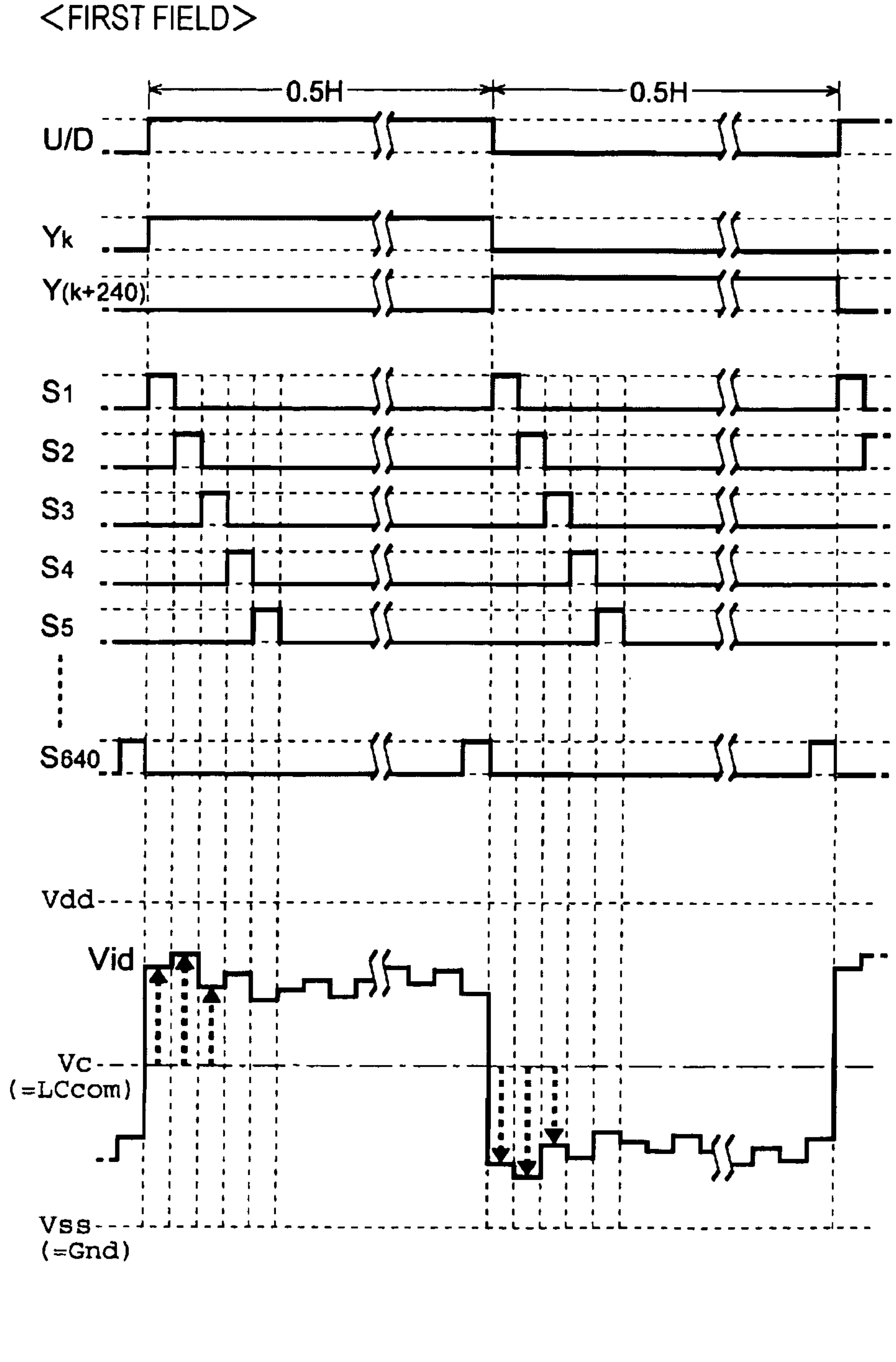
FIG. 7 shows an operation in a first field in the electro-optical device.
Figure 8:
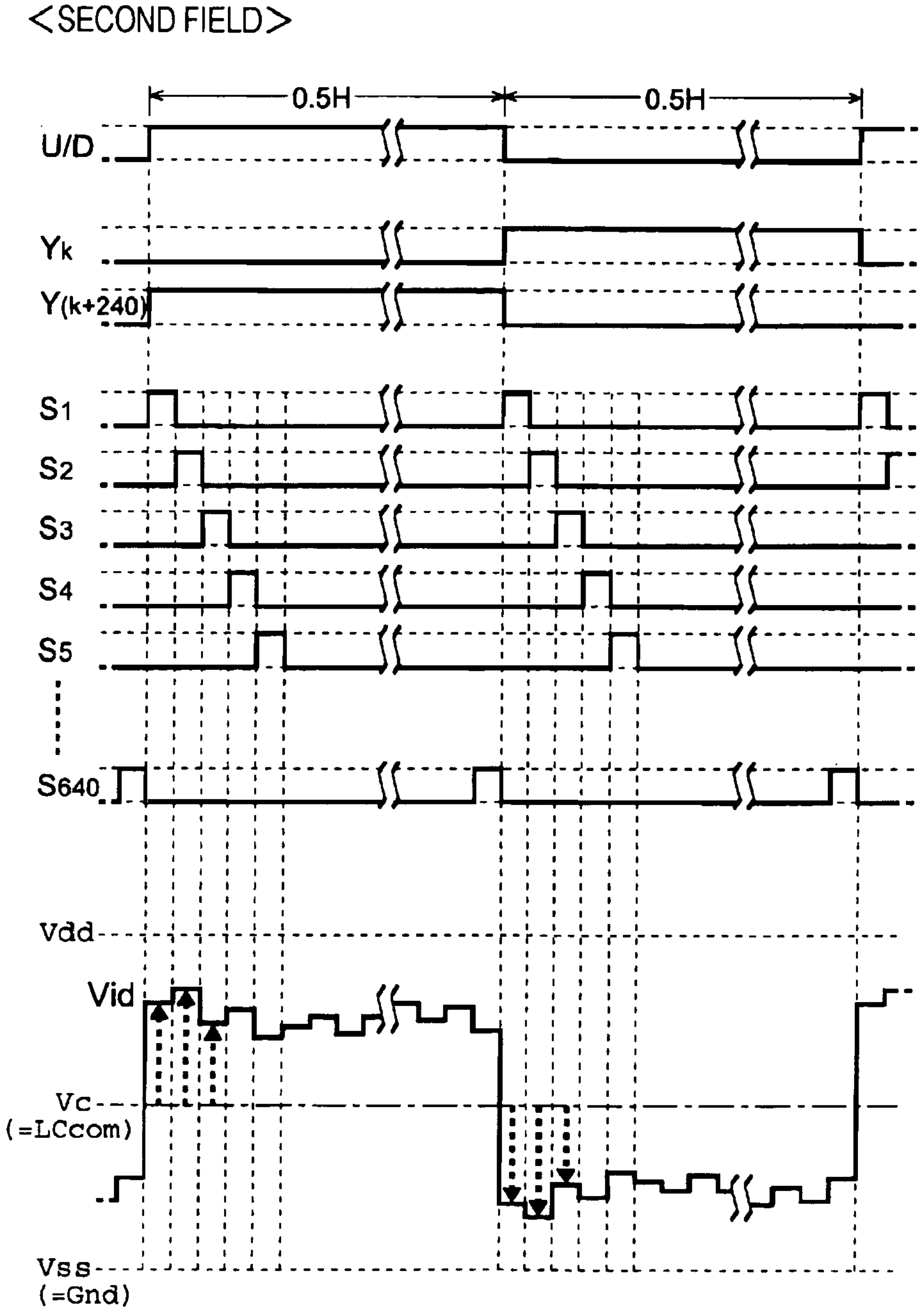
FIG. 8 shows an operation in a second field in the electro-optical device.

The sampling signal output circuit 140 outputs, in accordance with control signals CtrX, sampling signals S1, S2, S3, . . . , and S640 corresponding to the data lines 114 in the 1st to 640th columns. More specifically, as shown in FIG. 7 or FIG. 8, over the duration in which a single scanning line 112 is selected, the sampling signal output circuit 140 outputs sampling signals S1, S2, S3, . . . , and S640 such that the sampling signals, S1, S2, S3, . . . , and S640 exclusively reach the H level in that order.

The sampling switches 150 are provided in association with the data lines 114 in the 1st to 640th columns. One ends of the sampling switches 150 are commonly connected to the video signal line 155 to which a data signal Vid is supplied. The other ends of the sampling switches 150 are connected to the corresponding data lines 114. When a corresponding sampling signal reaches the H level, conduction (on-state) can be achieved between the one end and the other end of the corresponding sampling switch 150.

Thus, when a sampling signal Sj reaches the H level, a data signal Vid supplied to the video signal line 155 is sampled at the data line 114 in the jth column. Accordingly, the sampling signal output circuit 140 and the sampling switches 150 provided in the 1st to 640th columns form a data line driving circuit.

Figure 4:
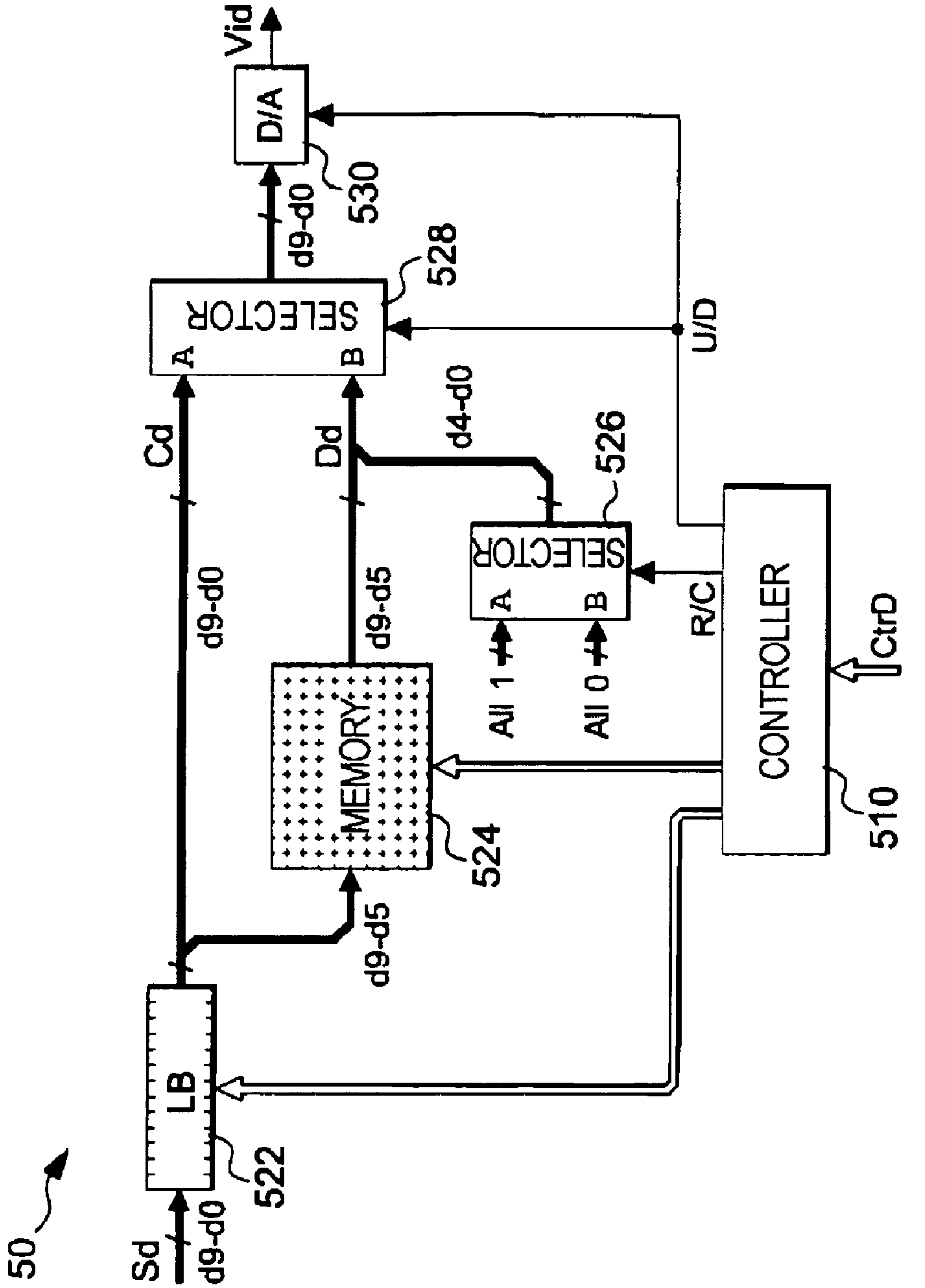
FIG. 4 shows an example of the configuration of a data processing circuit in the electro-optical device.

The data processing circuit 50, which is a characterizing portion of the invention, will be described. FIG. 4 is a block diagram showing the configuration of the data processing circuit 50.

Referring to FIG. 4, the data processing circuit 50 includes a controller 510, a line buffer (LB) 522, a memory 524, selectors 526 and 528, and a digital-to-analog (D/A) converter 530.

In accordance with control signals CtrD, the controller 510 controls writing and reading to and from the line buffer 522 and the memory 524, selects the selector 526 in accordance with a signal R/C, selects the selector 528 in accordance with a signal U/D, and controls the conversion polarity of the D/A converter 530.

The line buffer 522 stores image data Sd for one row. Then, the line buffer 522 reads the image data Sd at double speed, and supplies the read image data Sd as image data Cd to an input port A of the selector 528.

Actually, the line buffer 522 is configured to handle two rows. The line buffer 522 alternately performs an operation of storing the image data Sd and an operation of outputting the image data Cd.

The memory 524 includes storage regions corresponding to about half of the matrix arrangement of 480 rows and 640 columns. In each storage region, after the upper five bits, that is, d9 to d5, of the image data Cd are stored, the image data Cd is read and output with a delay of a period corresponding to half of one frame, that is, one field.

The selector 526 selects an input port A when the signal R/C is at the H level, and selects an input port B when the signal R/C is at the L level. The selector 526 outputs data supplied to the selected input port.

Here, data in which all the five bits are "1" (that is, "11111") is supplied to the input port A, and data in which all the five bits are "0" (that is, "00000") is supplied to the input port B.

In addition, as shown in FIG. 5, the logical level of the signal R/C is fixed during the period in which a scanning line 112 belonging to the lower region (the 241st to 480th rows) is selected in the first field and during the period in which a scanning line 112 belonging to the upper region (the 1st to 240th rows) is selected in the second field. The logical level of the signal R/C alternately inverts every time a scanning line 112 belonging to the lower region is selected in the first field and every time a scanning line 112 belonging to the upper region is selected in the second field. In addition, when focused on the periods in which the same scanning lines in the consecutive frames are selected, the logical levels of the signals R/C are opposite to each other.

The 5-bit data selected by the selector 526 is added as the lower five bits to the data of the bits d9 to d5 read from the memory 524. The combined data is supplied as image data Dd to the input port B of the selector 528. Accordingly, an adding circuit is configured.

The selector 528 selects the input port A when the signal U/D is at the H level, and selects an input port B when the signal U/D is at the L level. The selector 528 outputs data supplied to the selected input port.

Here, as shown in FIG. 5, in the first field, the signal U/D is at the H level during the period in which a scanning line 112 belonging to the upper region (the 1st to 240th rows) is selected, and the signal U/D is at the L level during the period in which a scanning line 112 belonging to the lower region (the 241st to 480th rows) is selected. In contrast, in the second field, the signal U/D is at the L level during the period in which a scanning line 112 belonging to the upper region is selected, and the signal U/D is at the H level during the period in which a scanning line 112 belonging to the lower region is selected.

The D/A converter 530 converts image data Cd or Dd selected by the selector 528 into a voltage having a polarity corresponding to the level of a signal U/D, and outputs the voltage as a data signal Vid. More specifically, when the signal U/D is at the H level, the D/A converter 530 converts image data into a positive voltage higher than the voltage LCcom of the common electrode 108 by a voltage corresponding to the selected image data. In contrast, when the signal U/D is at the L level, the D/A converter 530 converts image data into a negative voltage lower than the voltage LCcom by a voltage corresponding to the selected image data.

The operation of the electro-optical device 10 will be described.

Figure 6A:
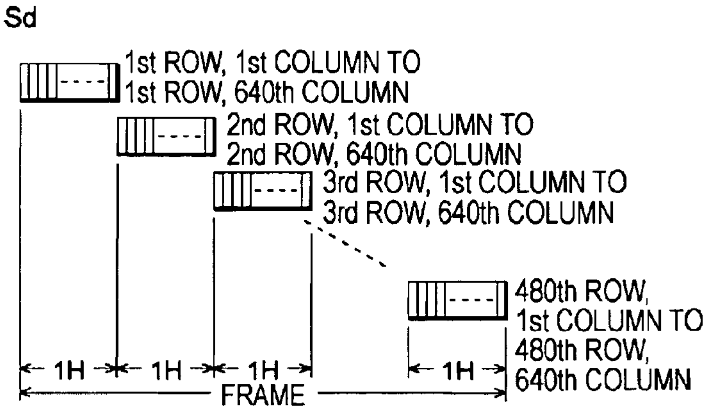
FIGS. 6A and 6B show examples of an operation of a line buffer in the electro-optical device.

During the duration of one frame, image data Sd is supplied in the order of pixels arranged in an area from the 1st row and the 1st column to the 1st row and the 640th column, pixels arranged in an area from the 2nd row and the 1st column to the 2nd row and the 640th column, pixels arranged in an area from the 3rd row and the 1st column to the 3rd row and the 640th column, . . . , and pixels arranged in an area from the 480th row and the 1st column to the 480th row and the 640th column, as shown in FIG. 6A.

Figure 6B:
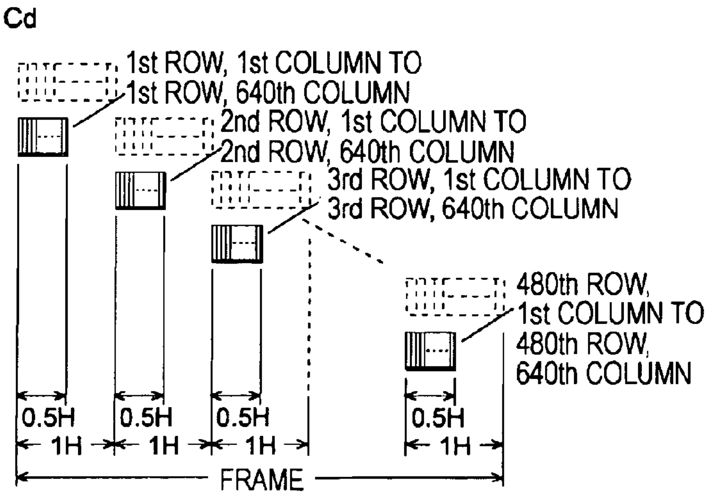

Image data Sd for one row is stored in the line buffer 522, and read at double the storage speed, as shown in FIG. 6B. Then, the upper five bits of the read image data Sd are stored in the memory 524, and all the 10 bits of the image data Sd are output as image data Cd.

Thus, when the period in which image data Sd for one row is supplied is represented as "1H", image data Cd for one row is output during the duration of 0.5H with a delay of 1H with respect to the image data Sd. Thus, an idle period of 0.5H is generated before image data Cd for the next row is output.

Although image data Cd read from the line buffer 522 is delayed with respect to image data Sd supplied from an external higher-level apparatus, such a delay is not an important issue in this embodiment.

The duration in which the image data Cd for the area from the 1st row and the 1st column to the 1st row and the 640th column is read from the line buffer 522 corresponds to the duration in which a scanning signal Y1 is at the H level in the first field.

Thus, during the duration in which the scanning signal Y1 is at the H level in the first field, the timing control circuit 60 reads from the line buffer 522 the image data Cd for the area from the 1st row and the 1st column to the 1st row and the 640th column. The timing control circuit 60 also stores the upper five bits of the read image data Cd into the memory 524. In addition, in accordance with the reading from the line buffer 522, the timing control circuit 60 controls the sampling signal output circuit 140 such that the sampling signals S1, S2, S3, . . . , and S640 reach the H level.

Since the signal U/D is at the H level during the duration in which the scanning signal Y1 is at the H level (see FIG. 5), the selector 528 selects the input port A. Thus, the image data Cd for the area from the 1st row and the 1st column to the 1st row and the 640th column read from the line buffer 522 is supplied to the D/A converter 530. Since the signal U/D is at the H level, the D/A converter 530 converts the image data Cd into a voltage having a positive polarity and outputs the voltage as a data signal Vid.

Thus, the data signal Vid during the duration in which the scanning signal Y1 is at the H level in the first field has a voltage waveform as represented by the duration in which a scanning signal Yk (k=1) is at the H level in FIG. 7. The data signal Vid represents a voltage higher than the voltage LCcom by a voltage corresponding to image data dnl.

In FIG. 7 (and FIG. 8), a symbol "k" is used for explaining a scanning line 112 in the upper region without specifying a row, and "k" represents an integer from 1 to 240. Thus, "(k+240)" inevitably indicates the scanning line 112 belonging to the lower region. In addition, in the first field, "(k+240)" indicates a row of a scanning line selected immediately after selection of the scanning line 112 in the kth row. In addition, in the second field, "(k+240)" indicates a row of a scanning line selected immediately before selection of the scanning line 112 in the kth row.

In addition, in FIG. 7 (and FIG. 8), for the sake of convenience, the vertical scale of the voltage waveform of a data signal Vid differs from the vertical scale of a scanning signal, a sampling signal, and the like treated as logical signals.

When a data signal Vid is converted from image data Cd for the 1st row and the 1st column, a sampling signal S1 is at the H level. Thus, the data signal Vid is sampled at the data line 114 in the 1st column.

In contrast, during the duration in which a scanning signal Y1 is at the H level, the TFTs 116 of the pixels 110 in the 1st row are ON. Thus, the data signal Vid supplied to the data line 114 in the 1st column is applied to the pixel electrode 118 in the 1st row and the 1st column. Thus, a difference between the voltage LCcom of the common electrode 108 and the voltage of the data signal Vid, that is, a voltage corresponding to a grayscale level designated by the image data Cd for the 1st row and the 1st column, is written to the liquid crystal capacitor 120 in the 1st row and the 1st column.

When a data signal Vid is converted from the image data Cd for the 1st row and the 2nd column, a sampling signal S2 is at the H level. Thus, the data signal Vid is sampled at the data line 114 in the 2nd column. The data signal Vid supplied to the data line 114 in the 2nd column is applied to the pixel electrode 118 in the 1st row and the 2nd column, and a voltage corresponding to a grayscale level designated by the image data Cd for the 1st row and the 2nd column is written to the liquid crystal capacitor 120 in the 1st row and the 2nd column.

Similarly, voltages corresponding to grayscale levels designated by image data Cd are written to the liquid crystal capacitor 120 in the 1st row and the 3rd column, the liquid crystal capacitor 120 in the 1st row and the 4th column, the liquid crystal capacitor 120 in the 1st row and the 5th column, . . . , and the liquid crystal capacitor 120 in the 1st row and the 640th column. Accordingly, positive writing is performed on the pixels in the area from the 1st row and the 1st column to the 1st row to the 640th column.

When the image data Cd for the area from the 1st row and the 1st column to the 1st row and the 640th column is read from the line buffer 522, an idle period of 0.5H is generated before the next image data Cd for the area from the 2nd row and the 1st column to the 2nd row and the 640th column is read, as described above. This idle period corresponds to the duration in which a scanning signal Y241 is at the H level in the first field.

That is, during the duration in which the scanning signal Y241 is at the H level in the first field, the timing control circuit 60 reads from the memory 524 the upper five bits of the image data for the area from the 241st row and the 1st column to the 241st row and the 640th column. In addition, in accordance with the reading from the memory 524, the timing control circuit 60 controls the sampling signal output circuit 140 such that the sampling signals S1, S2, S3, . . . , and S640 are at the H level.

The upper five bits of the image data for the area from the 241st row and the 1st column to the 241st row and the 640th column read from the memory 524 is equal to the upper five bits of the image data Cd read from the line buffer 522 and stored in the memory 524 one field before.

Figure 3B:
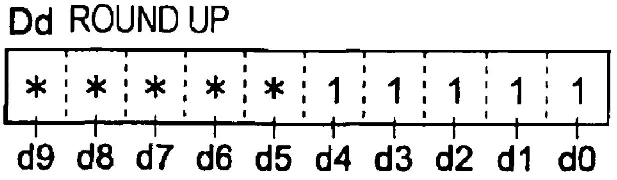

For example, a signal R/C is at the H level during the duration in which the scanning signal Y241 is at the H level in the first field (an Nth frame in FIG. 5). Since the signal R/C is at the H level, the selector 528 selects the input port A and outputs "11111". Thus, image data Dd is subjected to rounding up such that the lower five bits of all the ten bits of the image data Cd one frame before are forcibly changed to "1", as shown in FIG. 3B.

In addition, since a signal U/D is at the L level during the duration in which the scanning signal Y241 is at the H level in the first field (see FIG. 5), the selector 528 selects the input port B. Thus, the image data Dd is supplied to the D/A converter 530. Since the signal U/D is at the L level, the D/A converter 530 converts the image data Dd into a negative voltage and outputs the voltage as a data signal Vid.

Thus, the data signal Vid during the duration in which the scanning signal Y241 is at the H level in the first field has a voltage waveform represented by the duration in which the scanning signal Y241 (k+1=241) is at the H level in FIG. 7. The data signal Vid represents a voltage lower than the voltage LCcom by a voltage corresponding to the image data Dd.

When a data signal Vid is converted from image data Dd for the 241st row and the 1st column, the sampling signal S1 is at the H level. Thus, the data signal Vid is sampled at the data line 114 in the 1st column. In contrast, during the duration in which the scanning signal Y241 is at the H level, the TFTs 116 of the pixels 110 in the 241st row are ON.

Thus, the data signal Vid supplied to the data line 114 in the 1st column is applied to the pixel electrode 118 in the 241st row and the 1st column. Thus, a voltage designated by the image data Dd acquired by rounding up the lower five bits of the image data Cd in the 241st row and the 1st column supplied one field before is written to the liquid crystal capacitor 120 in the 241st row and the 1st column.

Similarly, voltages corresponding to image data Dd are written to the liquid crystal capacitor 120 in the 241st row and the 2nd column, the liquid crystal capacitor 120 in the 241st row and the 3rd column, the liquid crystal capacitor 120 in the 241st row and the 4th column, . . . , and the liquid crystal capacitor 120 in the 241st row and the 640th column. Thus, negative writing is performed on the pixels in the area from the 241st row and the 1st column to the 241st row and the 640th column.

During the duration in which a scanning signal Y2 is at the H level in the first field, image data Cd for the area from the 2nd row and the 1st column to the 2nd row and the 640th column is read from the line buffer 522. The upper five bits of the read image data are stored into the memory 52,4. In addition, in accordance with the reading from the line buffer 522, sampling signals S1, S2, S3, . . . , and S640 sequentially reach the H level.

Thus, similarly to the duration in which the scanning signal Y1 is at the H level, voltages corresponding to grayscale levels designated by the image data Cd are written to the liquid crystal capacitors 120 for the area from the 2nd row and the 1st column to the 2nd row and the 640th column. Thus, positive writing is performed on the pixels arranged in the area from the 2nd row and the 1st column to the 2nd row and the 640th column.

Then, during the duration in which a scanning signal Y242 is at the H level in the first field, the upper five bits of the image data for the area from the 242nd row and the 1st column to the 242nd row and the 640th column stored one field before are read from the memory 524. In addition, in accordance with the reading from the memory 524, sampling signals S1, S2, S3, . . . , and S640 sequentially reach the H level.

Figure 3C:
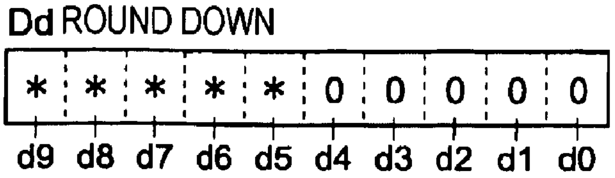

When a signal R/C is at the H level during the duration in which the scanning signal Y241 is at the H level, the signal R/C is at the L level during the duration in which the scanning signal Y242 is at the H level in the same field (the Nth frame in FIG. 5). Thus, the selector 528 selects the input port B, and outputs "00000". Thus, image data Dd is subjected to rounding down such that the lower five bits of all the ten bits of the image data Cd one field before are forcibly changed to "0", as shown in FIG. 3C.

Similarly to the duration in which the scanning signal Y241 is at the H level, voltages corresponding to image data Dd acquired by rounding down the lower five bits of the image data Cd for the area from the 242nd row and the 1st column to the 242nd row and the 640th column supplied one field before are written to the liquid crystal capacitor 120 in the 242nd row and the 1st column, the liquid crystal capacitor 120 in the 242nd row and the 2nd column, the liquid crystal capacitor 120 in the 242nd row and the 3rd column, the liquid crystal capacitor 120 in the 242nd row and the 4th column, . . . , and the liquid crystal capacitor 120 in the 242nd row and the 640th column. Thus, negative writing is performed on the pixels in the area from the 242nd row and the 1st column to the 242nd row and the 640th column.

Then, in the first field, similar operations are repeatedly performed. Positive voltages corresponding to grayscale levels designated by image data Cd are written to pixels belonging to the upper region. In contrast, negative voltages designated by image data Dd subjected to rounding up are written to pixels belonging to odd rows of the lower region, and negative voltages designated by image data Dd subjected to rounding down are written to pixels belonging to even rows of the lower region.

In the second field, the relationship between the upper region and the lower region is reversed.

That is, a scanning signal Y(k+240) belonging to the lower region first reaches the H level. Image data Cd for the area from the (k+1)th row and the 1st column to the (k+1)th row and the 640th column is read from the line buffer 522. The upper five bits of the read image data Cd are stored into the memory 524. In addition, in accordance with the reading from the line buffer 522, sampling signals S1, S2, S3, . . . , and S640 sequentially reach the H level. Thus, positive voltages corresponding to grayscale levels designated by the image data Cd are written to the liquid crystal capacitors 120 for the area from the (k+1)th row and the 1st column to the (k+1)th row and the 640th column.

In contrast, a scanning signal Yk belonging to the upper region reaches the H level, and the upper five bits of image data for the area from the ith row and the 1st column to the ith row and the 640th column stored one field before are read from the memory 524. In addition, in accordance with the reading from the memory 524, sampling signals S1, S2, S3, . . . , and S640 sequentially reach the H level. Negative voltages designated by image data Dd subjected to rounding up are written to pixels in odd rows in the upper region, and negative voltages designated by image data Dd subjected to rounding down are written to pixels in even rows in the upper region.

A data signal Vid during the duration in which the scanning signals Y(k+240) and Yk are at the H level in the second field has a voltage waveform shown in FIG. 8. The relationship between the upper region and the lower region in the second field is reversed from the relationship between the upper region and the lower region in the first field.

In this embodiment, in the first field, positive writing based on image data Cd read from the line buffer 522 is performed on the pixels 110 in the scanning lines 112 belonging to the upper region, and negative writing based on image data Dd read from the memory 524 is performed on the pixels 110 in the scanning lines belonging to the lower region. In contrast, in the second field, negative writing based on image data Dd read from the memory 524 is performed on the pixels 110 in the scanning lines 112 belonging to the upper region, and positive writing based on image data Cd read from the line buffer 522 is performed on the pixels 110 in the scanning lines 112 belonging to the lower region. Thus, in this embodiment, the write polarities for the pixels 110 in respective rows are shifted as shown in part (a) of FIG. 9. In part (a) of FIG. 9, selection of the scanning lines 112 is represented by black minute dots.

Figure 9:
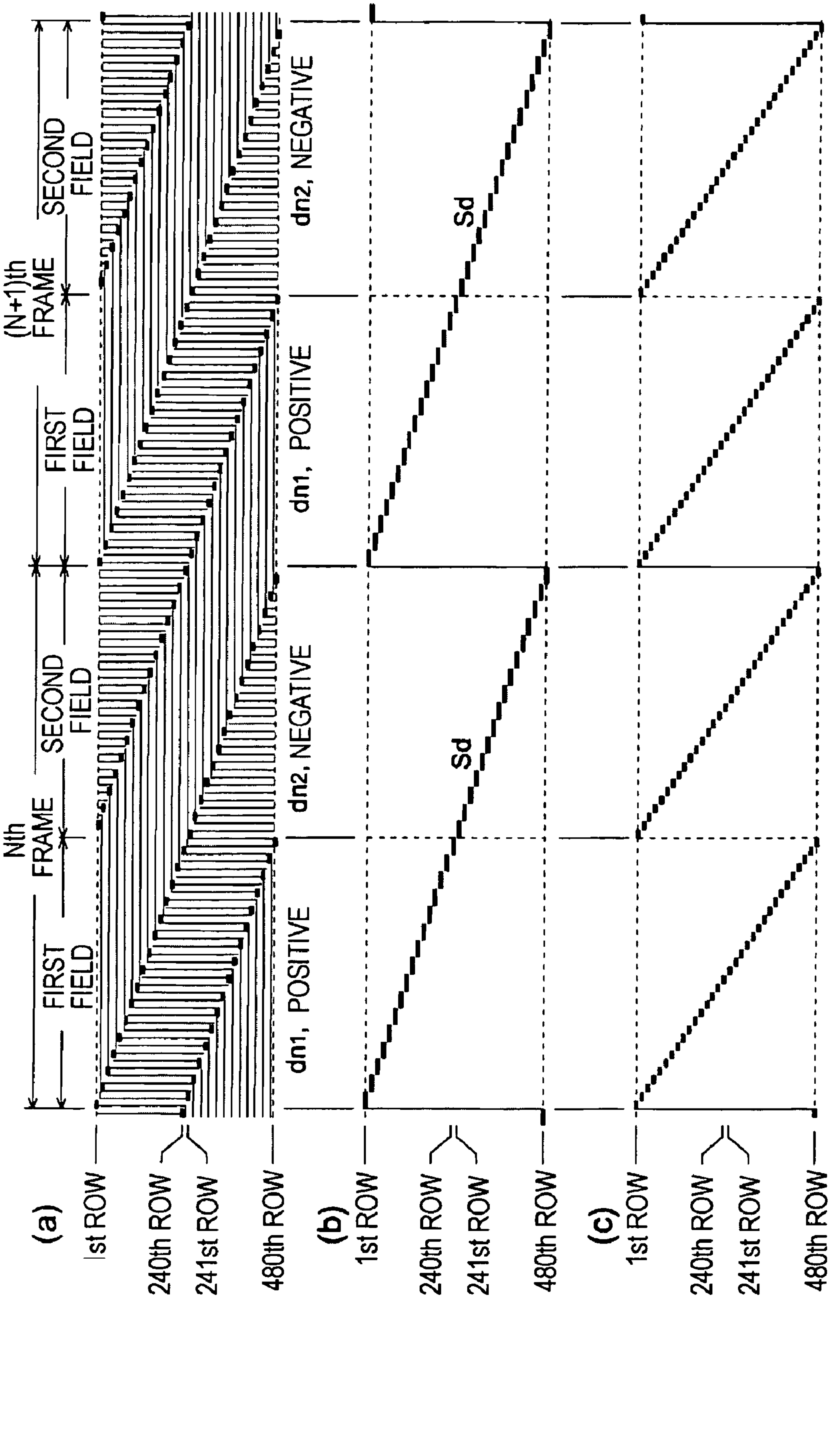
FIG. 9 shows writing and the like of pixels in the electro-optical device.

As shown in part (b) of FIG. 9, image data Sd is supplied over the duration of one frame. However, in the configuration in which one frame is divided into two fields and in which scanning is performed simply from the top row to the bottom row one by one in each of the fields, as shown in part (c) of FIG. 9, in order that flickering is made less noticeable, all the pixel rows need to be supplied at double speed within the duration of one field. Thus, there is a need not only to store image data for all the pixels, but also to supply the same data again in the second field. Thus, at least image data for two frames must be stored.

In contrast, in this embodiment, as image data serving as the basis of a voltage to be supplied to a pixel in the upper region, data read from the line buffer 522 is used in the first field of the Nth frame, and data read from the memory 524 is used in the second field of the Nth frame. In addition, as image data for a pixel in the lower region, data read from the line buffer 522 is used in the second field of the Nth frame, and data read from the memory 524 is used in the first field of the next (N+1)th frame. Thus, since the memory 524 only needs to delay image data Cd supplied within the duration of one field, which is half the one frame, by the duration of one field, the number of pixels corresponding to image data stored in the memory 524 corresponds to only about half of all the pixels. Furthermore, in this embodiment, since only half the ten bits of image data Cd is stored in the memory 524, the memory 524 needs a memory capacity sufficient only for storing a quarter of the amount of image data for one frame.

Thus, in this embodiment, for a reduction in flickering, the memory capacity is significantly reduced. Thus, a simpler configuration can be achieved.

In addition, as shown in parts (a) an (b) of FIG. 9, in the configuration in which one of positive writing and negative writing is performed on the pixels 110 in a frame (or a field) and the other one of positive writing and negative writing is performed on the pixels 110 in the next frame (or the next field), for example, for pixels in a row in an upper portion of the display area 100, during almost the entire duration from selection of the row to the next selection of the row, the polarities of voltages applied to the data lines 114 are equal to the polarities of voltages written to the row. In contrast, for pixels in a row in a lower portion of the display area 100, during almost the entire duration from selection of the row to the next selection of the row, the polarities of voltages applied to the data lines corresponding to the pixels are opposite to the polarities of voltages written to the row. Thus, the influence of the voltages of the data lines 114 exerted on hold voltages of the liquid crystal capacitors 120 of the pixels (in particular, the amount of leakage when the TFTs 116 are OFF) differs between the upper portion and the lower portion of the display area 100. Thus, uniform display cannot be achieved.

In contrast, in this embodiment, as shown in part (a) of FIG. 9, during the duration from selection of a row corresponding to a pixel to the next selection of the row, since positive voltages and negative voltages are applied alternately to the data lines 114, uniform display can be achieved.

In addition, in this embodiment, at a point in time when a row is selected, although the write polarity for a pixel in the row and the write polarity for a pixel in the row immediately above are contrary to each other, the write polarities for the other pixels are equal to each other. Thus, deterioration in display quality due to disclination (defective orientation) can be prevented.

Although rounding up and rounding down are performed alternately on the upper five bits of image data Cd read from the memory 524 in the foregoing embodiment, rounding up or rounding down may be fixedly performed.

Figure 10A:
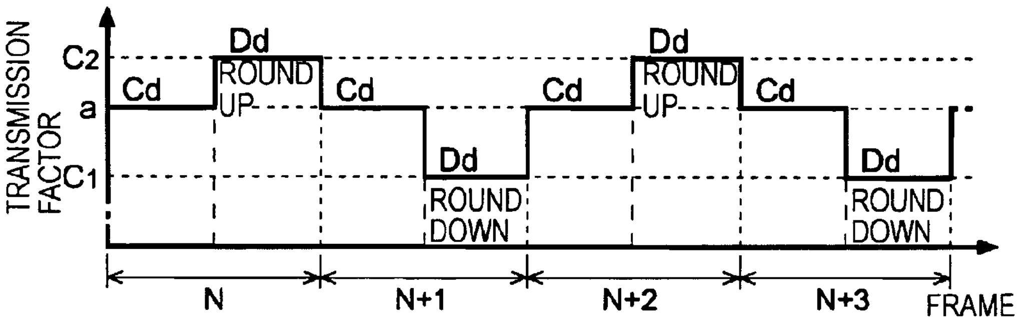
FIGS. 10A and 10B show changes in a transmission factor and the like of pixels in the electro-optical device.
Figure 10B:
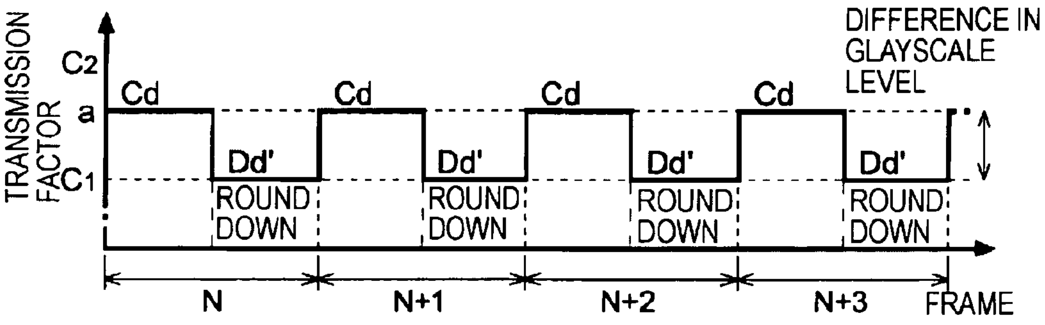

However, when rounding up or rounding down is fixedly performed, for example, when a configuration to always perform rounding down is adopted, as shown in FIG. 10B, in the first field, a positive voltage based on all the ten bits of the image data Cd is written to a pixel 110, and a transmittance factor a corresponding to the voltage is achieved. In contrast, in the second field, a negative voltage based on image data Dd' acquired by rounding down the lower five bits of the image data Cd is written to the pixel 110, and a transmittance factor C1 corresponding to the voltage is achieved. Thus, a difference between the transmittance factor a of the first field and the transmittance factor C1 of the second field occurs in the pixel 110. This difference not only causes so-called flickering but also deteriorates the quality of the liquid crystal 105 due to application of DC components.

Thus, in this embodiment, as image data Dd used in the second field, rounding up and rounding down on the lower five bits of image data Cd read from the memory 524 are alternately performed row by row. In addition, in the case of the same rows, rounding up and rounding down are alternately performed frame by frame.

Accordingly, in the case of a pixel 110, as shown in FIG. 10A, in the first field, a positive voltage based on all the ten bits of image data Cd is written to the pixel 110 and the transmittance factor a corresponding to the voltage is achieved, and in the second field, a negative voltage based on image data Dd acquired by rounding down the lower five bits of the image data Cd read from the memory 524 is written to the pixel 110 and the transmittance factor C1 corresponding to the voltage is achieved. Furthermore, in the second field of the next frame, a negative voltage based on image data Dd acquired by rounding up the lower five bits of the image data Cd read from the memory 524 is written to the pixel 110 and a transmittance factor C2 corresponding to the voltage is achieved.

Thus, in this embodiment, in the case of a unit of two frames, differences in voltages in the second field are averaged. Thus, flickering and deterioration in the quality of the liquid crystal 105 due to application of DC components can be reduced.

In addition, in this embodiment, in the second field, in the case of the same pixels, rounding up and rounding down are alternately performed frame by frame. In addition, in the second field, rounding up and rounding down are alternately performed row by row.

Figure 11:
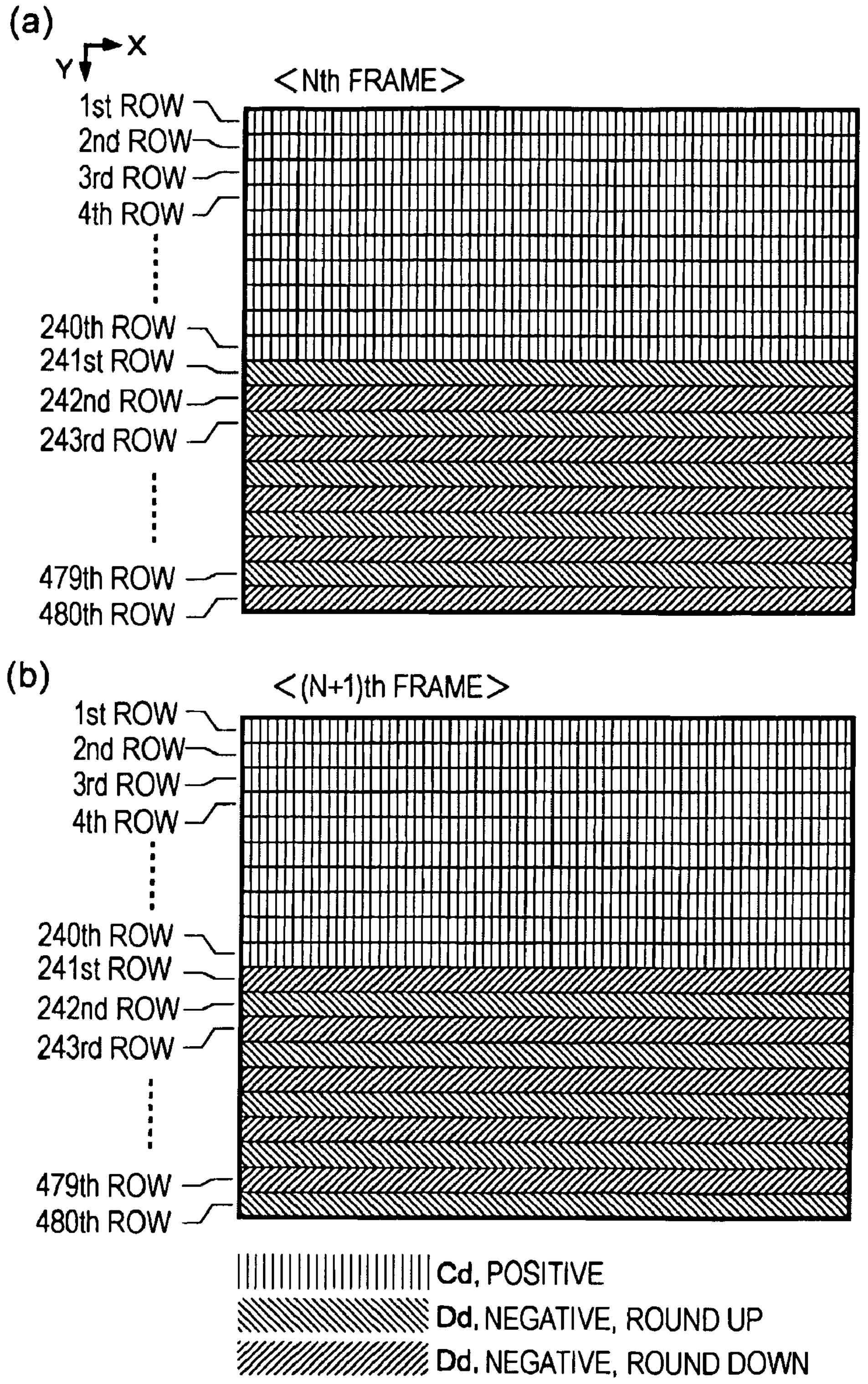
FIG. 11 shows states of a display area in the electro-optical device.

Thus, for example, in the Nth frame, immediately after completion of the first field, as shown in part (a) of FIG. 11, negative voltages based on image data acquired by rounding up the lower five bits of image data Cd read from the memory 524 are written to the pixels 110 in odd rows in the lower region including the 241st to 480th rows, and negative voltages based on image data Dd acquired by rounding down the lower five bits of the image data Cd are written to the pixels 110 in even rows in the lower region including the 241st to 480th rows.

In the next (N+1)th frame, immediately after completion of the first field, as shown in part (b) of FIG. 11, negative voltages based on image data Dd acquired by rounding down the lower five bits of image data Cd read from the memory 524 are written to the pixels 110 in the odd rows in the lower region including the 241st to 480th rows, and negative voltages based on image data Dd acquired by rounding up the lower five bits of the image data Cd are written to the pixels 110 in the even rows in the lower region including the 241st to the 480th rows.

Thus, rows to which voltages based on image data Dd subjected to rounding up are written and rows to which voltages based on image data Dd subjected to rounding down are written appear alternately, and these rows are shifted frame by frame. Thus, a difference in brightness of pixel rows becomes less noticeable.

Figure 12:
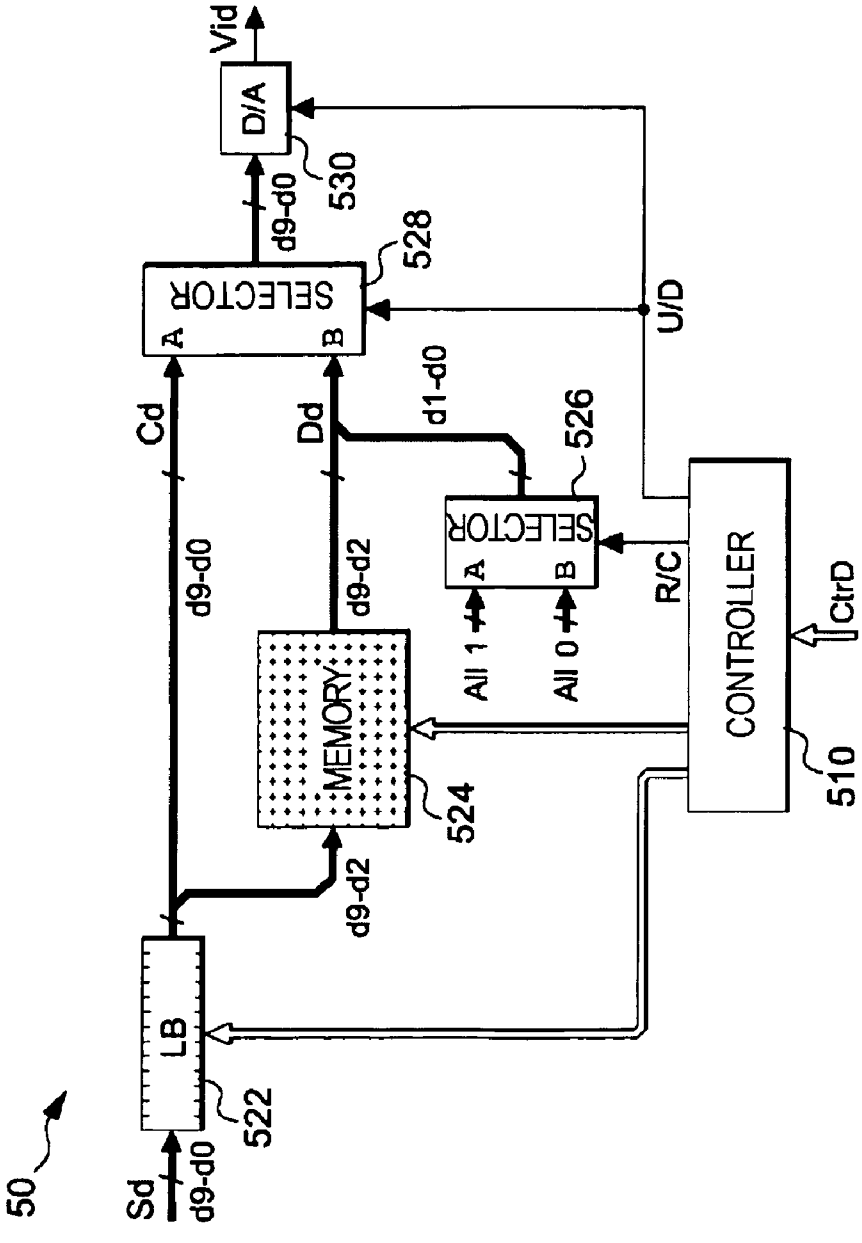
FIG. 12 shows an example of the configuration of a data processing circuit according to another embodiment of the invention.

In the foregoing embodiment, a configuration to store the upper five bits of image data Cd into the memory 524 is adopted. However, as shown in FIG. 12, a configuration to store, for example, the upper eight bits, d9 to d2, which is smaller than the number of bits of the image data Cd, and to perform rounding up and rounding down on the lower two bits, d1 and d0, may be adopted.

When the number of bits to be stored in the memory 524 increases, an advantage in reduction of the memory capacity is reduced. However, since the difference between the transmittance factor C2 acquired by rounding up and the transmittance factor C1 acquired by rounding down is reduced, the variation in brightness of pixels is reduced. Thus, flickering can be less noticeable.

In addition, in the foregoing embodiment, in the second field, rounding up or rounding down is commonly performed on the same row. However, rounding up and rounding down may be performed pixel by pixel, and in the case of the same pixels, rounding up and rounding down may be alternately performed frame by frame.

In addition, a frame is not necessarily divided into two. A frame may be divided into three or more fields.

In addition, in the foregoing embodiment, when image data is converted into a data signal Vid, image data Cd is converted into a positive voltage and image data Dd is converted into a negative voltage. However, the image data Cd may be converted into a negative voltage and the image data Dd may be converted into a positive voltage.

In addition, in the foregoing embodiment, transmission-type pixels are used as the pixels 110. However, the pixels 110 may be reflection-type pixels in which the pixel electrodes 118 common electrode 108 are made of reflective metal or may be half-transmission-and-half-reflection-type pixels in which a transmission type and a reflection type are combined together. If reflection-type pixels or the like are adopted, a reflective layer may be provided below the pixel electrodes 118 or the common electrode 108, instead of forming the pixel electrodes 118 or the common electrode 108 by reflective metal.

In addition, a normally white mode is not necessarily adopted. A normally black mode may be adopted.

In addition, twisted nematic (TN) liquid crystal is used in the foregoing embodiment. However, liquid crystal may be of, for example, a bi-stable type having a memory property, such as a bi-stable twisted nematic (BTN) type or a ferroelectric type, a polymer-dispersed type, a guest-host (GH) type in which a dye (guest) having an anisotropy in the absorption of visible light between a longitudinal direction and a lateral direction of a molecule is dissolved in liquid crystal (host) having a constant molecular alignment such that dye molecules and liquid crystal molecules are aligned in parallel.

In addition, a vertical alignment (homeotropic alignment) configuration in which liquid crystal molecules are aligned in a vertical direction with respect to both substrates when a voltage is not applied and the liquid crystal molecules are aligned in a horizontal direction with respect to both the substrates when a voltage is applied can be adopted. Alternatively, a parallel (horizontal) alignment (homogeneous alignment) configuration in which liquid crystal molecules are aligned in a horizontal direction with respect to both the substrates when a voltage is not applied and the liquid crystal molecules are aligned in a vertical direction with respect to both the substrates when a voltage is applied can be adopted. As described above, the invention is applicable to various types of liquid crystal and various alignment configurations.

Figure 13:
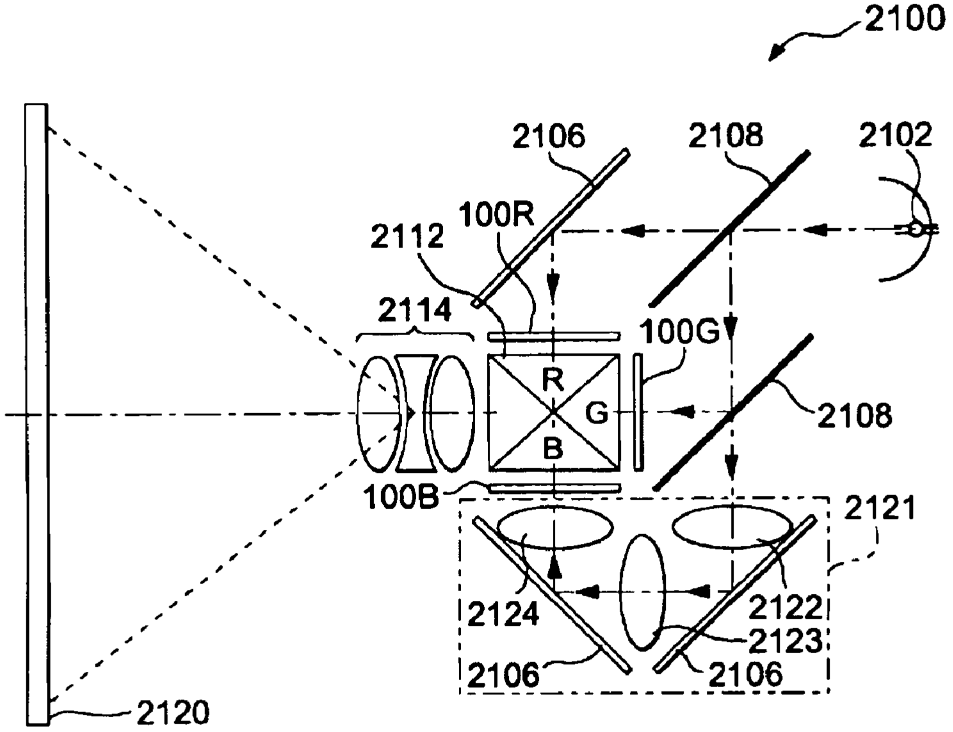
FIG. 13 shows an example in which the electro-optical device is applied to a projector.

An example of an electronic apparatus including an electro-optical device according to any one of the foregoing embodiments will now be described. FIG. 13 shows an example of the structure of a three-plate projector 2100 including the electro-optical device 10 as a light valve.

In the projector 2100, light to be incident to the light valve is separated into three primary colors, red (R), green (G), and blue (B), by three mirrors 2106 and two dichroic mirrors 2108 disposed inside the projector 2100, and red light, green light, and blue light are guided to light valves 100R, 100G, and 100B for the corresponding primary colors. Blue light has an optical path longer than that of each of red light and green light. Thus, in order to prevent optical loss, blue light is guided to the light valve 100B via a relay lens system 2121 including an incident lens 2122, a relay lens 2123, and an output lens 2124.

The configuration of each of the light valves 100R, 100G, and 100B is similar to that of the display area 100 of the electro-optical device 10 according to any one of the foregoing embodiments. The light valves 100R, 100G, and 100B are driven in accordance with image data corresponding to R, G, and B colors supplied from an external higher-level apparatus (not shown).

Light modulated by the light valves 100R, 100G, and 100B is incident to the dichroic prism 2112 from three directions. In the dichroic prism 2112, red light and blue light is refracted at 90 degrees, and green light goes straight. Thus, after images of respective colors are combined together, a normally rotated and enlarged combined image is projected by a lens unit 2114. Thus, a color image is displayed on a screen 2120.

Transmission images formed by the light valves 100R and 100B are reflected by the dichroic prism 2112 and then projected, and a transmission image formed by the light valve 100G is projected without being reflected by the dichroic prism 2112. Thus, a horizontal scanning direction by the light valves 100R and 100B is opposite to a horizontal scanning direction by the light valve 100G so that display of left-right reversed images is achieved.

In addition to the example described with reference to FIG. 13, a direct viewing type, such as a cellular phone, a personal computer, a television, a monitor of a video camera, a car navigation apparatus, a pager, an electronic notebook, an electronic calculator, a word processor, a work station, a television telephone, a point of sale (POS) terminal, a digital still camera, an apparatus provided with a touch panel, or the like may be used as an electronic apparatus. In addition, an electro-optical device according to an embodiment of the invention can be applied to an electronic apparatus of various types.

What is claimed is:

1. An electro-optical device comprising:

a plurality of pixels arranged in association with intersections of a plurality of scanning lines and a plurality of data lines, each of the plurality of pixels displaying a grayscale level corresponding to a data signal supplied to a corresponding data line when a scanning line is selected;

a memory that stores upper n bits of input image data in which the grayscale level of each of the plurality of pixels is designated by m bits and that reads the stored n bits of image data, where "m" and "n" represent positive integers satisfying a condition m>n;

an adding circuit that adds lower (m−n) bits to the n bits of image data read from the memory;

a selector that selects the input image data when the m bits of image data are input and that selects image data including the (m−n) bits added thereto by the adding circuit when the n bits of image data are read from the memory;

a scanning line driving circuit that selects, from among the plurality of scanning lines, the scanning line corresponding to the image data selected by the selector; and a data line driving circuit that supplies the data signal based on the image data selected by the selector to the data line corresponding to the selected image data.

2. The electro-optical device according to claim 1, wherein the adding circuit sets, as 0 or 1, all the bits to be added to the n bits of image data read from the memory.

3. The electro-optical device according to claim 2, wherein the adding circuit alternately switches, at a predetermined cycle, the bits to be added.

4. The electro-optical device according to claim 3, wherein the adding circuit alternately switches, every time image data for one row is read from the memory, the bits to be added.

5. The electro-optical device according to claim 3, wherein the adding circuit alternately switches, frame by frame, the bits to be added, in the case of image data of identical pixels.

6. The electro-optical device according to claim 3, wherein the adding circuit alternately switches, every time image data for one row is read from the memory, the bits to be added, and alternately switches, frame by frame, the bits to be added, in the case of image data of identical pixels.

7. An electro-optical device including a plurality of pixels arranged in association with intersections of a plurality of scanning lines and a plurality of data lines, each of the plurality of pixels displaying a grayscale level corresponding to a voltage of a data signal supplied to a corresponding data line when a scanning line is selected, wherein a frame is divided into a first field and a second field, the device comprising:

a memory that stores upper n bits of image data in which the grayscale level of each of the plurality of pixels is designated by m bits, the image data being input during a period of the frame, and that reads the stored n bits of image data after a period of one field passes and during a period in which the m bits of image data are not input, where "m" and "n" represent positive integers satisfying a condition m>n;

an adding circuit that adds lower (m−n) bits to the n bits of image data read from the memory;

a selector that selects the input image data when the m bits of image data are input and that selects image data including the (m−n) bits added thereto by the adding circuit when the n bits of image data are read from the memory;

a scanning line driving circuit that selects, from among the plurality of scanning lines, the scanning line corresponding to the image data selected by the selector;

a converter that converts the selected image data into a voltage having one of a positive polarity and a negative polarity on the basis of a predetermined potential and outputs the voltage as the data signal when the input m bits of image data are selected and that converts the selected image data into a voltage having the other one of the positive polarity and the negative polarity on the basis of the predetermined potential and outputs the voltage as the data signal when the image data including the (m−n) bits added thereto is selected; and a data line driving circuit that supplies the data signal converted by the converter to the data line corresponding to the selected image data.

8. The electro-optical device according to claim 1, wherein the adding circuit alternately sets, every time image data for one row is read from the memory, as 0 and 1, all the (m−n) bits to be added, and alternately sets, frame by frame, as 0 and 1, all the (m−n) bits to be added, in the case of image data of identical pixels.

9. A driving method for an electro-optical device including a plurality of pixels arranged in association with intersections of a plurality of scanning lines and a plurality of data lines, each of the plurality of pixels displaying a grayscale level corresponding to a data signal supplied to a corresponding data line when a scanning line is selected, the method comprising:

storing into a memory upper n bits of input image data in which the grayscale level of each of the plurality of pixels is designated by m bits and reading from the memory the stored n bits of image data after a predetermined period passes, where "m" and "n" represent positive integers satisfying a condition m>n;

adding lower (m−n) bits to the n bits of image data read from the memory;

selecting the input image data when the m bits of image data are input and selecting image data including the (m−n) bits added thereto by an adding circuit when the n bits of image data are read from the memory;

selecting, from among the plurality of scanning lines, the scanning line corresponding to the selected image data; and supplying the data signal based on the selected image data to the data line corresponding to the selected image data.

10. An image processing circuit comprising:

a memory that stores upper n bits of input image data in which a grayscale level of each of a plurality of pixels is designated by m bits and that reads the stored n bits of image data after a predetermined period passes, where "m" and "n" represent positive integers satisfying a condition m>n;

an adding circuit that adds lower (m−n) bits to the n bits of image data read from the memory; and a selector that selects and outputs the input image data when the m bits of image data are input and that selects and outputs image data including the (m−n) bits added thereto by the adding circuit when the n bits of image data are read from the memory.

11. An image processing method comprising:

storing into a memory upper n bits of input image data in which a grayscale level of each of a plurality of pixels is designated by m bits and reading from the memory the stored n bits of image data after a predetermined period passes, where "m" and "n" represent positive integers satisfying a condition m>n;

adding lower (m−n) bits to the n bits of image data read from the memory; and selecting and outputting the input image data when the m bits of image data are input and selecting and outputting image data including the (m−n) bits added thereto by an adding circuit when the n bits of image data are read from the memory.

12. An electronic apparatus comprising the electro-optical device as set forth in claim 1.

13. An electro-optical device that is provided with pixels, which are arranged corresponding to intersections of a plurality of scanning lines and a plurality of data lines and become a grayscale level corresponding to data signals supplied to the data lines when the scanning lines are selected, the electro-optical device supplying, in each of first and second fields in which one frame is divided, the data signals to the respective pixels through the data lines, the electro-optical device comprising:

a memory that inputs image data in which the grayscale level of each of the pixels is designated by m bits of image data at the first field, stores upper n (m, n are positive integers satisfying m>n) bits of the input image data, and reads the stored n bits of image data at the second field;

an adding circuit that adds lower (m−n) bits to the n bits of image data read from the memory;

a selector that selects the input image data at the time of the first field, and selects the image data in which the (m−n) bits of image data are added by the adding circuit at the time of the second field;

a scanning line driving circuit that selects, from among the plurality of scanning lines, the scanning line corresponding to the image data selected by the selector; and a data line driving circuit that supplies a data signal that is based on the image data selected by the selector to the data line corresponding to the selected image data.

14. An electro-optical device that is provided with pixels, which are arranged corresponding to intersections of a plurality of scanning lines and a plurality of data lines and become a grayscale level corresponding to a voltage of data signals supplied to the data lines when the scanning lines are selected, and that divides one frame into each of first and second fields, the electro-optical device comprising:

a memory that inputs image data in which the grayscale level of each of the pixels is designated by m bits of image data at the first field, stores upper n (m, n are positive integers satisfying m>n) bits of the input image data, and reads the stored n bits of image data at the second field;

an adding circuit that adds lower (m−n) bits to the n bits of image data read from the memory;

a selector that selects the input image data at the time of the first field, and selects image data in which the (m−n) bits of image data are added by the adding circuit at the time of the second field;

a scanning line driving circuit that selects, from among the plurality of scanning lines, the scanning line corresponding to the image data selected by the selector;

a converter that converts the selected image data into a voltage having one of a positive polarity and a negative polarity, using a predetermined potential as a reference, at the time of the first field, and converts the selected image data into a voltage having the other one of the positive polarity and the negative polarity, using the predetermined potential as a reference, at the time of the second field, and outputs the voltages as the respective data signals; and a data line driving circuit that supplies the data signal converted by the converter to the data line corresponding to the selected image data.

15. A method of driving an electro-optical device that is provided with pixels, which are arranged corresponding to intersections of a plurality of scanning lines and a plurality of data lines and become a grayscale level corresponding to data signals supplied to the data lines when the scanning lines are selected, the electro-optical device supplying, in each of first and second fields in which one frame is divided, the data signals to the respective pixels through the data lines, the method comprising:

inputting image data in which m bits of image data is designated by the grayscale level of each of the pixels at the first field, storing upper n (m, n are positive integers satisfying m>n) bits of the input image data, and reading the stored n bits of image data at the second field;

adding lower (m−n) bits to the n bits of image data read from the memory;

selecting the input image data at the time of the first field, and selecting image data in which the (m−n) bits of image data are added at the time of the second field;

selecting, from among the plurality of scanning lines, the scanning line corresponding to the selected image data; and supplying the data signal that is based on the selected image data to the data line corresponding to the selected image data.

16. An image processing circuit that processes and outputs input image data to an electro-optical device that is provided with pixels, which are arranged corresponding to intersections of a plurality of scanning lines and a plurality of data lines and become a grayscale level corresponding to data signals supplied to the data lines when the scanning lines are selected, the electro-optical device supplying, in each of first and second fields in which one frame is divided, the data signals to the respective pixels through the data lines, the image processing circuit comprising:

a memory that inputs image data in which the grayscale level of each of the pixels is designated by m bits of image data at the first field, stores upper n (m, n are positive integers satisfying m>n) bits of input image data, and reads the stored n bits of image data at the second field;

an adding circuit that adds lower (m−n) bits to the n bits of image data read from the memory; and a selector that selects the input image data at the time of the first field, and selects the image data in which the (m−n) bits of image data are added by the adding circuit at the time of the second field;

the electro-optical device selecting, from among the plurality of scanning lines, the scanning line corresponding to the image data selected by the selector; and the data signal that is based on the image data selected by the selector being supplied to the data line corresponding to the selected image data.

17. An image processing method that processes and outputs input image data to an electro-optical device that is provided with pixels, which are arranged corresponding to intersections of a plurality of scanning lines and a plurality of data lines and become a grayscale level corresponding to data signals supplied to the data lines when the scanning lines are selected, and that supplies, in each of first and second fields in which one frame is divided, the data signals to the respective pixels through the data lines, the method comprising:

inputting image data in which m bits of image data is designated by the grayscale level of each of the pixels at the first field, storing upper n (m, n are positive integers satisfying m>n) bits of input image data, and reading the stored n bits of image data at the second field;

adding lower (m−n) bits to the n bits of image data read from the memory;

selecting the input image data at the time of the first field, and selecting and outputting image data in which the (m−n) bits of image data are added at the time of the second field;

the electro-optical device selecting, from among the plurality of scanning lines, the scanning line corresponding to the selected image data; and the data signal that is based on the selected image data being supplied to the data line corresponding to the selected image data.

* * * * *